United States Patent [19]
Fujimura et al.

[11] Patent Number: 5,844,828
[45] Date of Patent: Dec. 1, 1998

[54] SHIFT CIRCUIT AND SYSTEM HAVING THE SAME

[75] Inventors: Hiroki Fujimura; Takashi Miyamora, both of Tokyo, Japan

[73] Assignee: Kabushiki Kaisha Toshiba, Kawasaki, Japan

[21] Appl. No.: 905,276

[22] Filed: Aug. 6, 1997

[30] Foreign Application Priority Data

Aug. 8, 1996 [JP] Japan .................................. 8-210045

[51] Int. Cl.$^6$ ....................................................... G06F 7/00

[52] U.S. Cl. ......................................................... 364/715.08

[58] Field of Search ......................... 364/715.08; 377/69, 377/75

[56] References Cited

U.S. PATENT DOCUMENTS

| | | | |
|---|---|---|---|
| 4,495,598 | 1/1985 | Vahlstrom et al. | 364/715.08 |
| 4,509,144 | 4/1985 | Palmer | 364/715.08 |
| 5,073,864 | 12/1991 | Methvin et al. | 364/715.08 |

*Primary Examiner*—Tan V. Mai
*Attorney, Agent, or Firm*—Foley & Lardner

[57] ABSTRACT

A shift circuit consists of a sequence of a first stage shifter for receiving 32-bit input data, a second stage shifter, and a third stage shifter. The first stage shifter shifts the input data in a higher or lower direction by any one of 0 to 7 bits and provides the second stage shifter with a shifted 32-bit result. Each of the second and third stage shifters receives a shifted 32-bit result from the preceding stage shifter and shifts each byte of the shifted result independently in the higher or lower direction by 8 or 16 bits. The second and third stage shifters consist each of selectors that receive control signals, respectively, to realize various shifting operations on the input data, thereby providing a variety of data operations.

20 Claims, 8 Drawing Sheets ent invention is to provide a
SHIFT CIRCUIT AND SYSTEM HAVING THE SAME

BACKGROUND OF THE INVENTION

1. Field of the Invention

The present invention relates to a shift circuit for shifting $2^n$-bit input data in a higher or lower direction by a specified shift amount, and a system such as a microprocessor or a DSP (Digital Signal Processor) that employs the shift circuit.

2. Description of the Prior Art

FIG. 1 shows an example of a shift circuit according to a prior art. The shift circuit 100 receives 32-bit input data a[31:0], shifts the same in a higher (left in the figure) or lower (right in the figure) direction by a specified number of bits, and provides 32-bit output data b[31:0]. The shift circuit 100 consists of a first stage shifter for receiving input data and shifting the same by any one of 0 to 7 bits, a second stage shifter 72 for receiving the shifted result from the first stage shifter and shifting the same by 8 bits, and a third stage shifter 73 for receiving the shifted result from the second stage shifter 72 and shifting the same by 16 bits. These first to third stage shifters 71 to 73 are cascaded and commonly receive a shift left signal that indicates a shifting direction. If the shift left signal is active (for example, level "1"), it indicates a shift in the higher direction, and if inactive (level "0"), it indicates a shift in the lower direction. The number of bits to be shifted is instructed with shift amount signals (S4, S3, S2, S1, S0) each encoded into a binary number. Among the shift amount signals, the signals S0, S1, and S2 each of one bit are supplied to the first stage shifter 71, the signal S3 of one bit to the second stage shifter 72, and the signal S4 of one bit to the third stage shifter 73.

The second stage shifter 72 that carries out an 8-bit shift consists of four selectors 72a, 72b, 72c, and 72d. FIG. 2A shows an example of any one of these selectors. The selector receives three inputs (A[7:0], B[7:0], C[7:0]) and provides one output (Y[7:0]). The selector also receives the shift left signal and the shift amount signal S3 that indicates an 8-bit shift. The selector selects the input A if the shift left signal is "1" and the shift amount signal S3 is "1." If the shift left signal is "0" with the signal S3 being "1," the selector selects the input C, and if the signal S3 is "0," the input B without regard to the shift left signal. The selected input is provided as the output Y.

Returning to FIG. 1, in the selector 72a, the input A[7:0] is the output [23:16] of the first stage shifter 71, the input B[7:0] is the output [31:24] of the same, and the input C[7:0] is "0." In the selector 72b, the input A[7:0] is the output [15:8] of the first stage shifter 71, the input B[7:0] is the output [23:16] of the same, and the input C[7:0] is the output [31:24] of the same. In the selector 72c, the input A[7:0] is the output [7:0] of the first stage shifter 71, the input B[7:0] is the output [15:8] of the same, and the input C[7:0] is the output [23:16] of the same. In the selector 72d, the input A[7:0] is "0," the input B[7:0] is the output [7:0] of the first stage shifter 71, and the input C[7:0] is the output [15:8] of the same.

The third stage shifter 73 for carrying out a 16-bit shift consists of four selectors 73a, 73b, 73c, and 73d. FIG. 2B shows an example of any one of these selectors. The selector receives three inputs (A[7:0], B[7:0], C[7:0]) and provides one output (Y[7:0]). The selector also receives the shift left signal and the shift amount signal S4 indicating a 16-bit shift. The selector selects the input A if the shift left signal is "1" and the shift amount signal S4 is "1." If the shift left signal is "0" with the signal S4 being "1," the selector selects the input C, and if the signal S4 is "0," the input B without regard to the shift left signal. The selected input is provided as the output Y.

In the selector 73a shown in FIG. 1, the input A[7:0] is the output [15:8] of the selector 72c of the second stage shifter 72, the input B[7:0] is the output [31:24] of the selector 72a of the same, and the input C[7:0] is "0." In the selector 73b, the input A[7:0] is the output [7:0] of the selector 72d of the second stage shifter 72, the input B[7:0] is the output [23:16] of the selector 72b of the same, and the input C[7:0] is "0." In the selector 73c, the input A[7:0] is "0," the input B[7:0] is the output [15:8] of the selector 72c of the second stage shifter 72, and the input C[7:0] is the output [31:24] of the selector 72a of the same. In the selector 73d, the input A[7:0] is "0," the input B[7:0] is the output [7:0] of the selector 72d of the second stage shifter 72, and the input C[7:0] is the output [23:16] of the selector 72b of the same.

This structure operates such that, if the shift left signal is "1," the output data b is expressed as a[31−(S4, S3, S2, S1, S0):0]∥ $0^{(S4, S3, S2, S1, S0)}$, and if the shift left signal is "0," the output data b is expressed as $0^{(S4, S3, S2, S1, S0)}$∥ a[31:(S4, S3, S2, S1, S0)]. Here, "∥" indicates a bit linkage, and $0^{(S4, S3, S2, S1, S0)}$ indicates "0" for the bits of the signals (S4, S3, S2, S1, S0).

In the conventional shift circuit 100, signals indicating the shifting direction are commonly supplied to the shifters 71, 72, and 73, respectively. Namely, the three shifters 71 to 73 only simultaneously carry out a shifting operation in the same direction. Further, the second and third stage shifters 72 and 73 receive each a shift amount signal commonly for their own selectors. Namely, the selectors in any one of the shifters 72 and 73 must simultaneously carry out a shift operation for the number of bits specified by the shift amount signal. It is impossible for these selectors to carry out different shift operations, respectively.

Accordingly, the conventional shift circuit 100 of FIG. 1 is only capable of collectively shifting all input bits simply in the higher or lower direction by a specified number of bits. It is difficult for the prior art to carry out various shifting operations such as a byte reverse operation that manipulates order of byte data A, B, C, and D of input data of a[31:0] (A[31:24], B[23:16], C[15:8], D[7:0]) and provides, for example, output data of b[31:0] (D[31:24], C[23:16], B[15:8], A[7:0]). To realize this kind of shifting operation, the prior art must have a dedicated circuit.

As mentioned above, the conventional shift circuit collectively shifts all input bits in the same direction, and therefore, is incapable of carrying out various shifting operations such as independently and partly shifting input bits and individually changing the shifting direction and amount of each part of input data. Consequently, the prior art is incapable of achieving various data operations required by processors, etc., and therefore, lacks versatility.

The prior art, therefore, must have dedicated hardware to carry out a variety of shifting operations, and such hardware complicates and enlarges the structure of the shift circuit and the system employing the shift circuit.

SUMMARY OF THE INVENTION

In view of these problems, an object of the present invention is to provide a shift circuit capable of carrying out various shifting operations on input data and processing the data in various ways.

Another object of the present invention is to provide a shift circuit having a simple structure capable of carrying out a variety of data operations on input data such as shifting only specific bits in the input data.

Still another object of the present invention is to provide a system such as a microprocessor or a DSP having a simple structure to realize many data operations without dedicated hardware.

Still another object of the present invention is to provide a system such as a microprocessor or a DSP that is small and has high versatility.

In order to accomplish the objects, a first aspect of the present invention provides a shift circuit composed of a sequence of "n-2" shifters including a first stage shifter for receiving $2^n$-bit input data ($n \geq 5$), a second stage shifter, ..., an "n-3"th stage shifter, and an "n-2"th stage shifter. The first stage shifter shifts the input data in a higher or lower direction by a specified one of 0 to 7 bits and provides the second stage shifter with the shifted result. An "m"th ($2 \leq m \leq (n-2)$) stage shifter receives the result of a $2^n$-bit shift carried out by the preceding stage shifter and independently shifts each byte of the shifted result in the higher or lower direction by $2^{(m+1)}$ bits.

The first aspect of the present invention sets the shifting direction and the number of bits to shift of each byte of $2^n$-bit input data. Namely, the first aspect is capable of shifting only some bytes of the input data or changing the number of bits to shift and the shifting direction of some part of the input data. Consequently, the first aspect is able to carry out a variety of shifting operations on the input data without dedicated hardware.

A second aspect of the present invention provides a shift circuit consists of a sequence of a first stage shifter for receiving 16-bit input data, a second stage shifter, and a third stage shifter. The first stage shifter shifts the input data in a higher or lower direction by any one of 0 to 3 bits and provides the second stage shifter with the shifted result. The second stage shifter independently shifts 4-bit units of the shifted result of the first stage shifter in the higher or lower direction by 4 bits. The third stage shifter receives the shifted result of the second stage shifter and independently shifts 4-bit units of the shifted result in the higher or lower direction by 8 bits.

The second aspect of the present invention sets the shifting direction and the number of bits to shift of each 4-bit unit of 16-bit input data, so that it is possible to shift only some bytes of the input data and change the number of bits to shift and the shifting direction of each part of the input data. Consequently, the second aspect can achieve many shifting operations on the input data without dedicated hardware.

A third aspect of the present invention provides a system such as a microprocessor or a DSP that employs a shift circuit that is based on any one of the first and second aspects of the present invention. More precisely, the system at least has an execution unit including the shift circuit based on any one of the first and second aspects, an instruction decoder for providing the shift circuit with shift left and shift amount signals, and a register or a register file to receive the output of the shift circuit. The shift circuit according to the third aspect is formed of a sequence of, at least, three shifters, more generally, "n-2" ($n \geq 5$) shifters. Each of the second and the following stage shifters consists of selectors each for a byte or 4 bits. These selectors receive their own shift left and shift amount signals, respectively, from the instruction decoder, and therefore, are capable of optionally shifting specific bytes or 4-bit units. Accordingly, without adding a special circuit or a dedicated circuit to the system, the third aspect simply realizes various operations such as a byte reverse operation. In this way, the third aspect easily realizes an inexpensive versatile system. At the same time, the third aspect realizes the compactness of the system.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

DETAILED DESCRIPTION OF THE EMBODIMENTS

Figure 1:
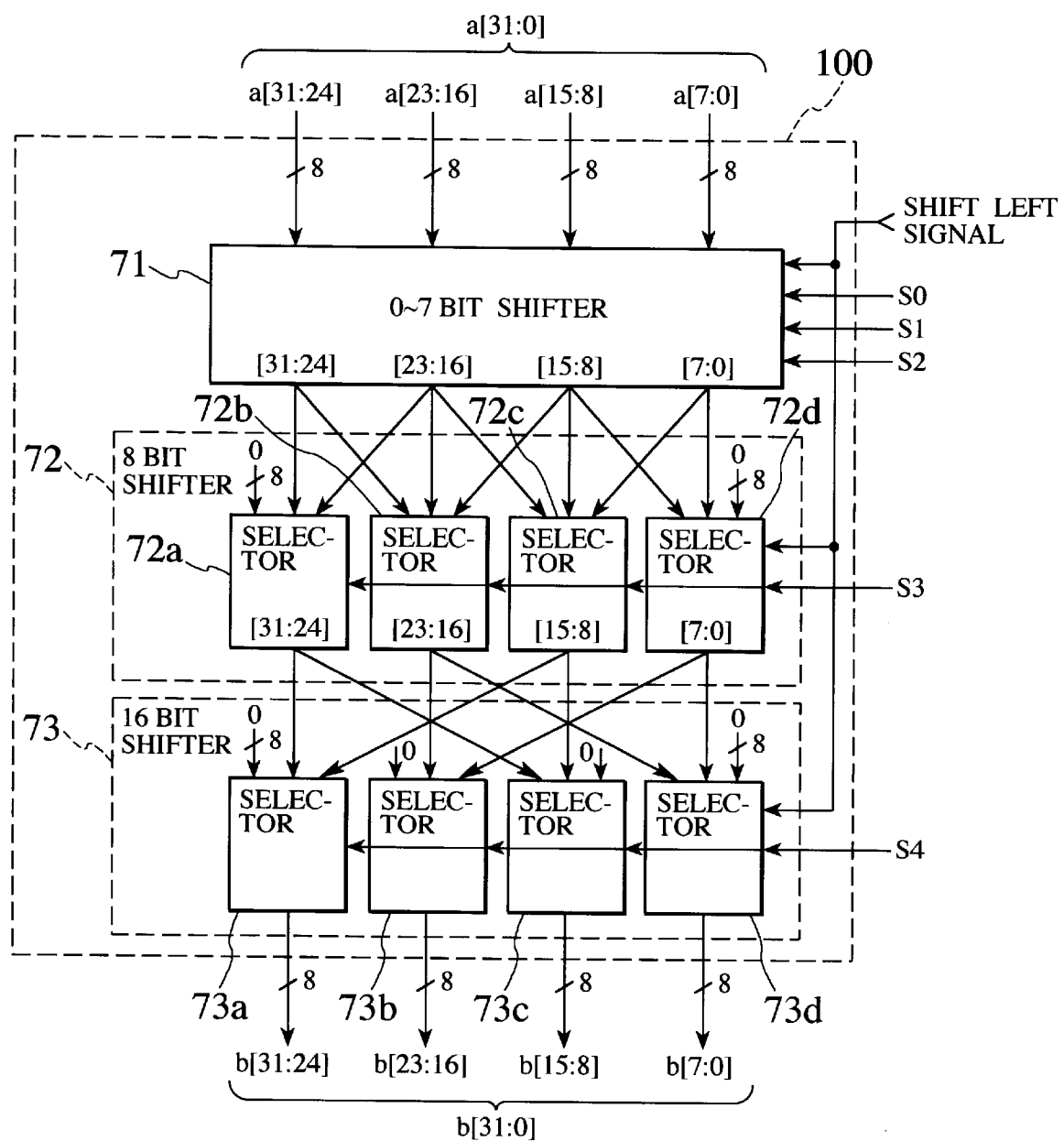
FIG. 1 shows a shift circuit according to a prior art.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

(First Embodiment)

Figure 3:
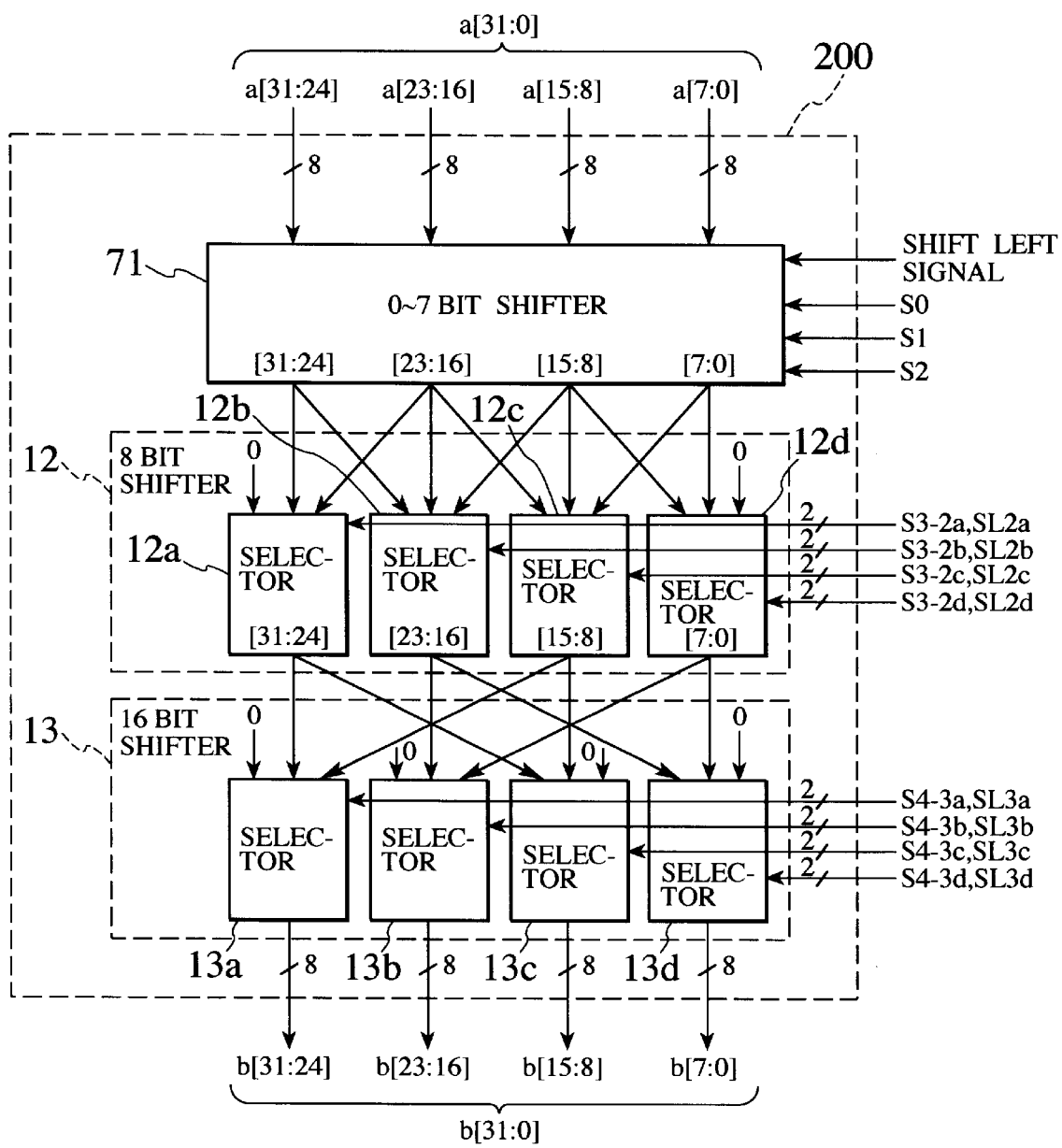
FIG. 3 shows the structure of a shift circuit according to a first embodiment of the present invention.

FIG. 3 shows a shift circuit 200 according to the first embodiment of the present invention. The shift circuit 200 receives 32-bit input data a[31:0], shifts the same in a higher (left in the figure) or lower (right in the figure) direction by a specified number of bits, and provides 32-bit output data b[31:0].

The shift circuit 200 consists of a first stage shifter 71 for receiving the input data and carrying out a shift of any one of 0 to 7 bits on the input data, a second stage shifter 12 for receiving the shifted result from the first stage shifter 71 and carrying out an 8-bit shift on each byte of the shifted result, and a third stage shifter 13 for receiving the shifted 32-bit result from the second stage shifter 12 and carrying out a 16-bit shift on each byte of the shifted result. These shifters 71, 12, and 13 are cascaded.

The first stage shifter 71 is equal to the first stage shifter 71 of FIG. 1. If a shift left signal indicating a shifting direction is active (for example, level "1"), the first stage shifter 71 shifts the input data in the higher direction, and if the shift left signal is inactive (level "0"), in the lower direction. The number of bits to shift is indicated with shift amount signals (S2, S1, S0) of 3 bits encoded into binary numbers and is any one of 0 to 7.

Figure 2A:
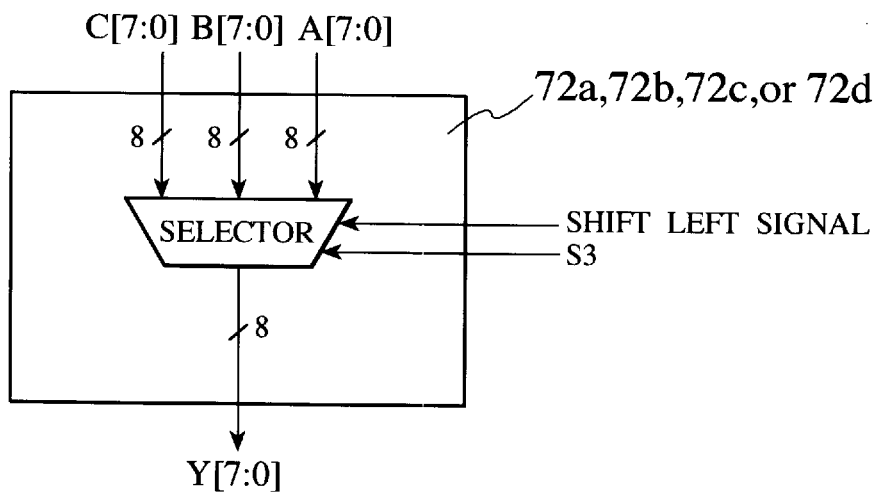
FIG. 2A shows the structure of a selector used for a second stage shifter shown in FIG. 1.
Figure 2B:
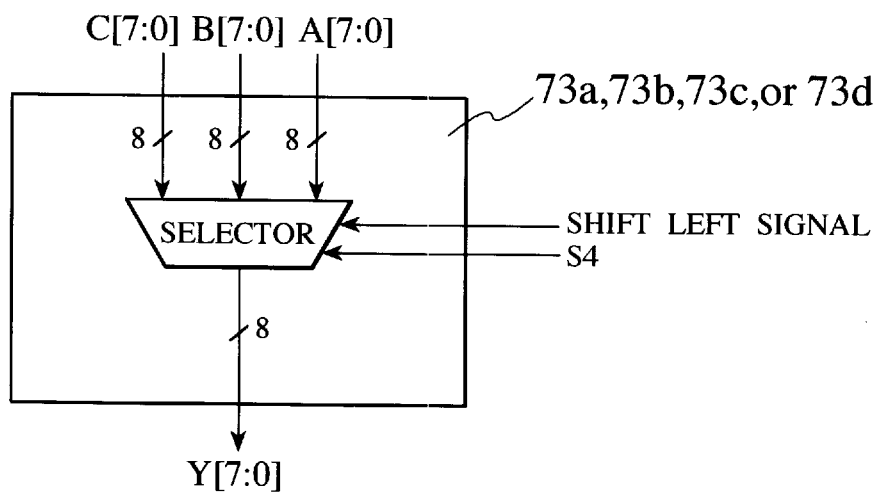
FIG. 2B shows the structure of a selector used for a third stage shifter shown in FIG. 3.

The second stage shifter 12 consists of four selectors 12a, 12b, 12c, and 12d each of which is a 3-input 1-output selector similar to the one shown in FIGS. 2A and 2B. Input and output relationships between the first and second stage shifters 71 and 12 are the same as those of FIG. 1. Unlike the selectors 72a to 72d of FIG. 1, the selectors 12a to 12d of FIG. 3 receive shift left signals SL2a, SL2b, SL2c, and SL2d, respectively. Each of these shift left signals is a one-bit signal to indicate a shifting direction. More precisely, the selector 12a receives the signal SL2a, the selector 12b receives the signal SL2b, the selector 12c receives the signal SL2c, and the selector 12d receives the signal SL2d. The selectors 12a to 12d also receive shift amount signals S3-2a, S3-2b, S3-2c, and S32d, respectively, each indicating the number of bits (8 bits) to shift. Namely, the selector 12a receives the signal S3-2a, the selector 12b receives the signal S3-2b, the selector 12c receives the signal S3-2c, and the selector 12d receives the signal S3-2d.

In this structure, the selector 12a selects the shifted output [23:16] of the first stage shifter 71 and shifts the same in the higher direction if the shift amount signal S3-2a is "1" to indicate an 8-bit shift and the shift left signal SL2a is active (for example, level "1"), selects 8 bits of "0" if the signal SL2a is inactive (level "0") with the signal S3-2a being "1," and selects the shifted output [31:24] of the first stage shifter 71 without regard to the signal SL2a if the signal S3-2a is "0." The selector 12b selects the shifted output [15:8] of the first stage shifter 71 and shifts the same in the higher direction if the shift amount signal S3-2b is "1" to indicate an 8-bit shift and the shift left signal SL2b is active (for example, level "1"), selects the shifted output [31:24] of the first stage shifter 71 and shifts the same in the lower direction if the signal SL2b is inactive (level "0") with the signal S3-2b being "1," and selects the shifted output [23:16] of the first stage shifter 71 without regard to the signal SL2b if the signal S3-2b is "0." The selector 12c selects the shifted output [7:0] of the first stage shifter 71 and shifts the same in the higher direction if the shift amount signal S3-2c is "1" to indicate an 8-bit shift and the shift left signal SL2c is active (for example, level "1"), selects the shifted output [23:16] of the first stage shifter 71 and shifts the same in the lower direction if the signal SL2c is inactive (level "0") with the signal S3-2c being "1," and selects the shifted output [15:8] of the first stage shifter 71 without regard to the signal SL2c if the signal S3-2c is "0." The selector 12d selects 8 bits of "0" if the shift amount signal S3-2d is "1" to indicate an 8-bit shift and the shift left signal SL2d is active (for example, level "1"), selects the shifted output [15:8] of the first stage shifter 71 and shifts the same in the lower direction if the signal SL2d is inactive (level "0") with the signal S32d being "1," and selects the shifted output [7:0] of the first stage shifter 71 without regard to the signal SL2d if the signal S3-2d is "0."

The third stage shifter 13 consists of four selectors 13a, 13b, 13c, and 13d each of which is the same as the 3-input 1-output selector of FIGS. 2A and 2B. The input and output relationships between the second and third stage shifters 12 and 13 are the same as those of FIG. 1. However, unlike the selectors of FIG. 1, the selectors 13a to 13d of FIG. 3 receive shift left signals SL3a, SL3b, SL3c, and SL3d, respectively, each being one bit to indicate a shifting direction. In detail, the selector 13a receives the signal SL3a, the selector 13b receives the signal SL3b, the selector 13c receives the signal SL3c, and the selector 13d receives the signal SL3d. The selectors 13a to 13d also receive shift amount signals S4-3a, S4-3b, S4-3c, and S4-3d, respectively, each indicating the number of bits (16 bits) to shift. More precisely, the selector 13a receives the signal S4-3a, the selector 13b receives the signal S4-3b, the selector 13c receives the signal S43c, and the selector 13d receives the signal S4-3d.

In this structure, the selector 13a selects the shifted output [15:8] of the selector 12c of the second stage shifter 12 and shifts the same in the higher direction if the shift amount signal S4-3a is "1" to indicate a 16-bit shift and the shift left signal SL3a is active (for example, level "1"), selects 8 bits of "0" if the signal SL3a is inactive (level "0") with the signal S43a being "1," selects the shifted output [31:24] of the selector 12a of the second stage shifter 12 without regard to the signal SL3a if the signal S4-3a is "0," and provides the shifted output b[31:24] of the shift circuit 200. The selector 13b selects the shifted output [7:0] of the selector 12d of the second stage shifter 12 and shifts the same in the higher direction if the shift amount signal S43b is "1" to indicate a 16-bit shift and the shift left signal SL3b is active (for example, level "1"), selects 8 bits of "0" if the signal SL3b is inactive (level "0") with the signal S4-3b being "1," selects the shifted output [23:16] of the selector 12b of the second stage shifter 12 without regard to the signal SL3b if the signal S4-3b is "0," and provides the shifted output b[23:16] of the shift circuit 200. The selector 13c selects 8 bits of "0" if the shift amount signal S4-3c is level "1" to indicate a 16-bit shift and the shift left signal SL3c is active (for example, level "1"), selects the shifted output [31:24] of the selector 12a of the second stage shifter 12 and shifts the same in the lower direction if the signal SL3c is inactive (level "0") with the signal S4-3c being "1," selects the shifted output [15:8] of the selector 12c of the second stage shifter 12 without regard to the signal SL3c if the signal S4-3c is "0," and provides the output b[15:8] of the shift circuit 200. The selector 13d selects 8 bits of "0" if the shift amount signal S4-3d is "1" to indicate a 16-bit shift and the shift left signal SL3d is active (for example, level "1" ), selects the shifted output [23:16] of the selector 12b of the second stage shifter 12 and shifts the same in the lower direction if the signal SL3d is inactive (level "0") with the signal S4-3d being "1," selects the shifted output [7:0] of the selector 12d of the second stage shifter 12 without regard to the signal SL3d if the signal S4-3d is "0," and provides the shifted output b[7:0] of the shift circuit 200.

If the shift left signals SL2a to SL2d and SL3a to SL3d supplied to the second and third stage shifters 12 and 13 are made identical to the shift left signal supplied to the first stage shifter 71, the shift amount signals S3-2a to S3-2d supplied to the second stage shifter 12 are made equal to one another, and the shift amount signals S4-3a to S4-3d supplied to the third stage shifter 13 are made equal to one another, the same shifting operation as that of the conventional shift circuit of FIG. 1 is achieved.

Controlling the shift left and shift amount signals in various ways realizes many shifting operations that are unachievable by the conventional shift circuit of FIG. 1. Examples of the shift left and shift amount signals according to the present invention will be explained with reference to FIGS. 4A to 4E. In the following, a mark "x" means "don't care."

Example (a)

A case of the setting of the shift left and shift amount signals

| Shift left signals | | | Shift amount signals | | |
|---|---|---|---|---|---|
| SL1 | = | x | S0 = S1 = S2 = 0 | | |
| SL2a | = | 1 | S3 – 2a | = | 1 |
| SL2b | = | 0 | S3 – 2b | = | 1 |
| SL2c | = | 1 | S3 – 2c | = | 1 |

-continued

| Shift left signals | | | Shift amount signals | | |
|---|---|---|---|---|---|
| SL2d | = | 0 | S3 − 2d | = | 1 |
| SL3a | = | 1 | S4 − 3a | = | 1 |
| SL3b | = | 1 | S4 − 3b | = | 1 |
| SL3c | = | 0 | S4 − 3c | = | 1 |
| SL3d | = | 0 | S4 − 3d | = | 1 |

Figure 4A:
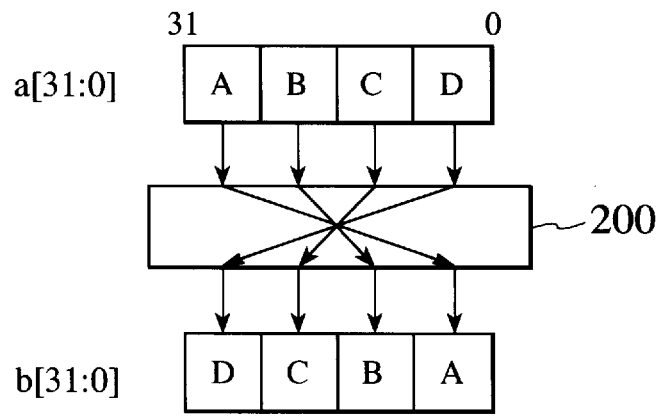
FIGS. 4A to 4E show examples of shift operations carried out by the shift circuit of FIG. 3.

As shown in FIG. 4A, this is a byte reverse operation on input data a[31:0] (ABCD) and provides output data b[31:0] (DCBA).

Example (b)

A case of the setting of the shift left and shift amount signals

| Shift left signals | | | Shift amount signals | | |
|---|---|---|---|---|---|
| SL1 | = | x | S0 = S1 = S2 = 0 | | |
| SL2a | = | x | S3 − 2a | = | 0 |
| SL2b | = | x | S3 − 2b | = | 0 |
| SL2c | = | x | S3 − 2c | = | 0 |
| SL2d | = | x | S3 − 2d | = | 0 |
| SL3a | = | 1 | S4 − 3a | = | 1 |
| SL3b | = | 1 | S4 − 3b | = | 1 |
| SL3c | = | 0 | S4 − 3c | = | 1 |
| SL3d | = | 0 | S4 − 3d | = | 1 |

Figure 4B:
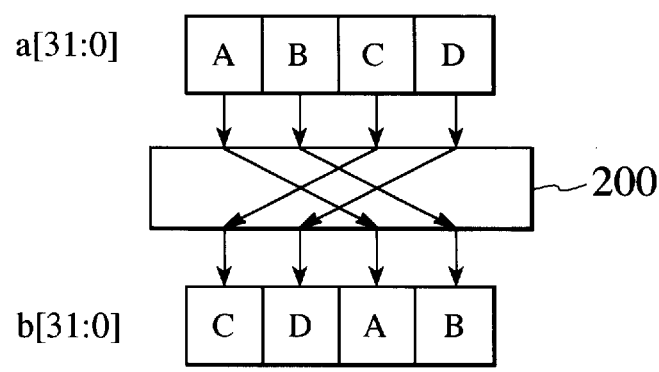

As shown in FIG. 4B, this is a half-word reverse operation on input data a[31:0] (ABCD) and provides output data b[31:0] (CDAB).

Example (c)

A case of the setting of the shift left and shift amount signals

| Shift left signals | | | Shift amount signals | | |
|---|---|---|---|---|---|
| SL1 | = | x | S0 = S1 = S2 = 0 | | |
| SL2a | = | x | S3 − 2a | = | 0 |
| SL2b | = | 1 | S3 − 2b | = | 1 |
| SL2c | = | 0 | S3 − 2c | = | 1 |
| SL2d | = | x | S3 − 2d | = | 0 |
| SL3a | = | x | S4 − 3a | = | 0 |
| SL3b | = | x | S4 − 3b | = | 0 |
| SL3c | = | x | S4 − 3c | = | 0 |
| SL3d | = | x | S4 − 3d | = | 0 |

Figure 4C:
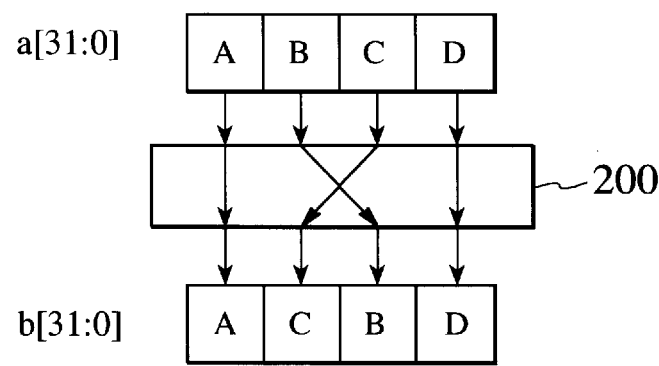

As shown in FIG. 4C, this is a byte shuffle operation on the input data a[31:0] (ABCD) and provides output data b[31:0] (ACBD).

Example (d)

A case of the setting of the shift left and shift amount signals

| Shift left signals | | | Shift amount signals | | |
|---|---|---|---|---|---|
| SL1 | = | x | S0 = S1 = S2 = 0 | | |
| SL2a | = | x | S3 − 2a | = | 0 |
| SL2b | = | x | S3 − 2b | = | 0 |
| SL2c | = | 0 | S3 − 2c | = | 1 |
| SL2d | = | x | S3 − 2d | = | 0 |
| SL3a | = | 0 | S4 − 3a | = | 1 |
| SL3b | = | 0 | S4 − 3b | = | 1 |
| SL3c | = | x | S4 − 3c | = | 0 |
| SL3d | = | x | S4 − 3d | = | 0 |

Figure 4D:
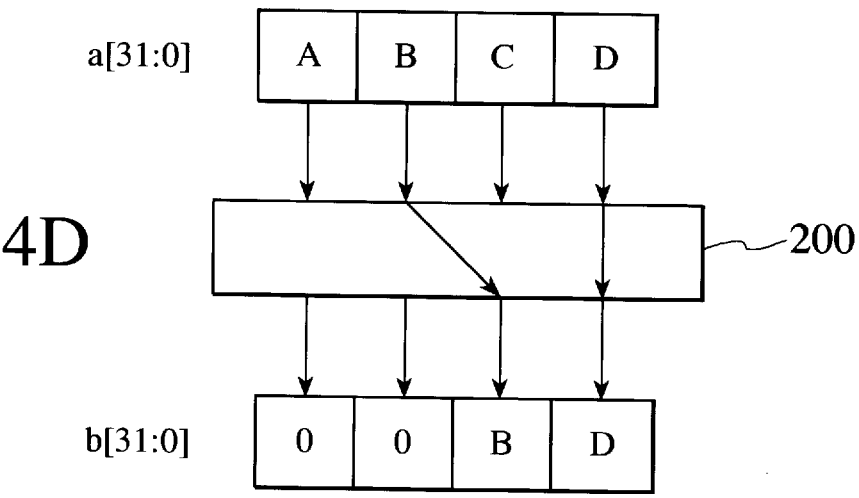

As shown in FIG. 4D, this is a pack operation (half word to byte) on input data a[31:0] (ABCD) and provides output data b[31:0] (OOBD).

Example (e)

A case of the setting of the shift left and shift amount signals

| Shift left signals | | | Shift amount signals | | |
|---|---|---|---|---|---|
| SL1 | = | x | S0 = S1 = S2 = 0 | | |
| SL2a | = | x | S3 − 2a | = | 0 |
| SL2b | = | 1 | S3 − 2b | = | 1 |
| SL2c | = | x | S3 − 2c | = | 0 |
| SL2d | = | x | S3 − 2d | = | 0 |
| SL3a | = | 0 | S4 − 3a | = | 1 |
| SL3b | = | x | S4 − 3b | = | 0 |
| SL3c | = | 1 | S4 − 3c | = | 1 |
| SL3d | = | x | S4 − 3d | = | 0 |

Figure 4E:
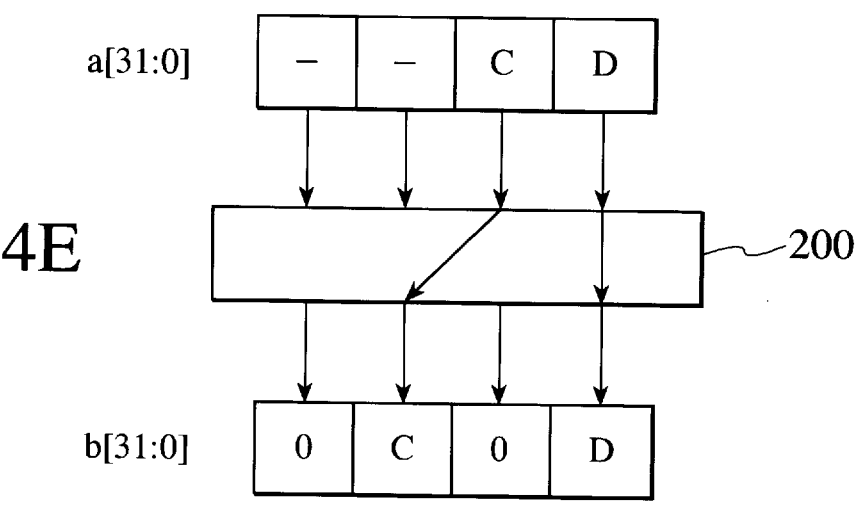

As shown in FIG. 4E, this is an unpack operation (byte to half word) on input data a[31:0] (ABCD) and provides output data b[31:0] (OCOD).

In addition to the above-mentioned operations, many other shifting operations are achievable by changing the control signals of the selectors. In this way, the first embodiment of the present invention changes the control signals of the selectors in various ways to shift only partial bits of input data, or set the number of bits to shift and the shifting direction of each part of input data, thereby realizing a variety of data operations. These data operations are greatly effective when changing endians or executing multimedia instructions and are useful for a shift circuit for a high-function microprocessor.

(Second Embodiment)

Figure 5:
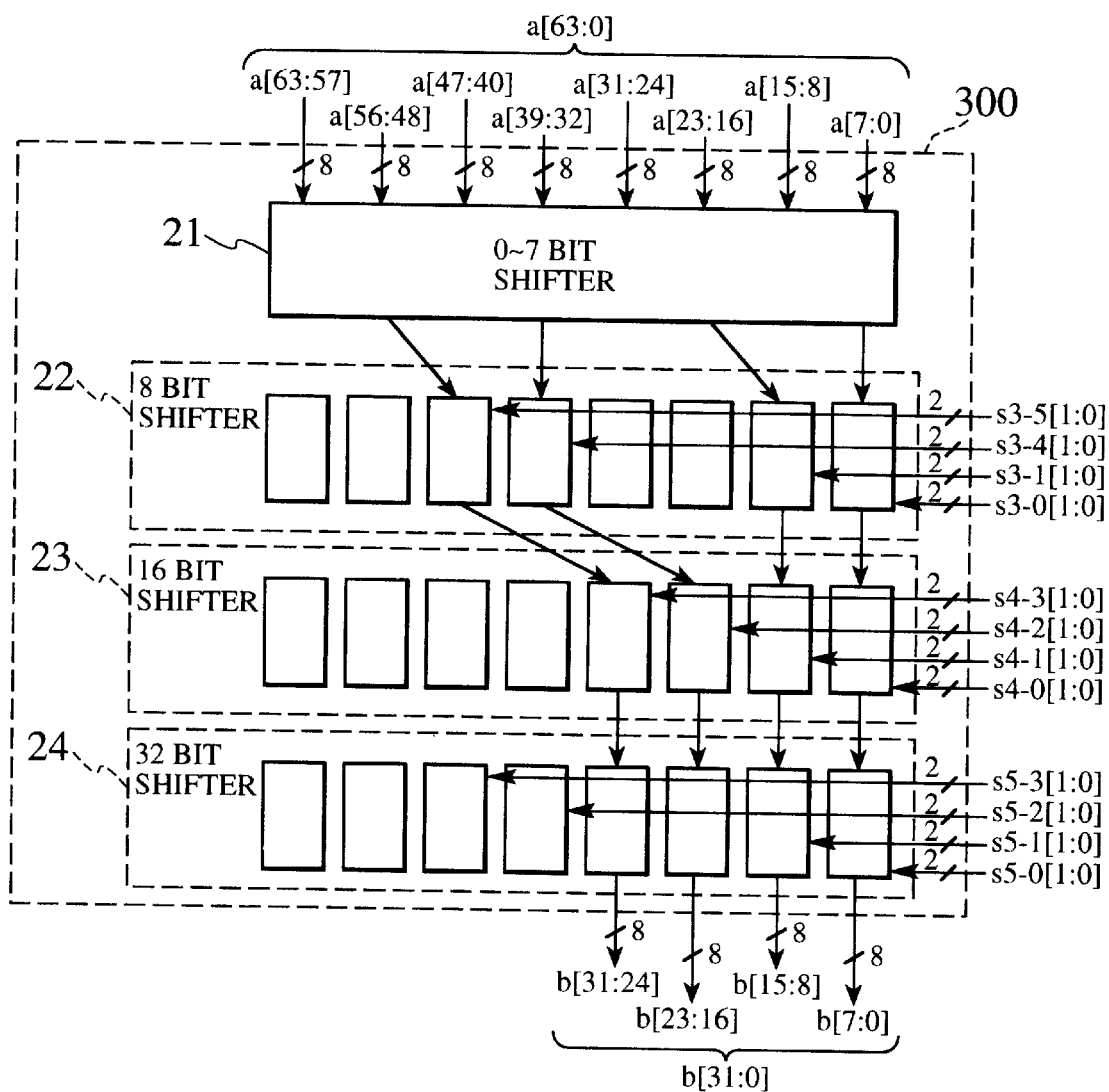
FIG. 5 shows the structure of a shift circuit according to a second embodiment of the present invention.

FIG. 5 shows the structure of a shift circuit according to the second embodiment of the present invention. This shift circuit 300 receives 64-bit input data and consists of a first stage shifter 21 for shifting the 64-bit input data by any one of 0 to 7 bits, a second stage 8-bit shifter 22, a third stage 16-bit shifter 23, and a fourth stage 32-bit shifter 24. The second to fourth stage shifters 22 to 24 consist each of selectors that receive, similar to the selectors of FIG. 3, shift left and shift amount signals, respectively, to select each a byte among input data.

Figure 6:
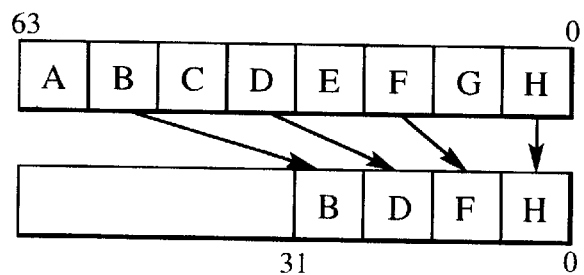
FIG. 6 shows an example of a shift operation carried out by the shift circuit of FIG. 5.

The shift circuit 300 of FIG. 5 properly controls the shift left and shift amount signals to shift the input data a[63:0] in bytes and provide output data b[63:0]. For example, as shown in FIG. 6, input data (ABCDEFGH) is four 16-bit data pieces stored in a 64-bit source register. Lower 8 bits are picked up from each of the four 16-bit data pieces, and the picked-up bits are combined (BDFH) and stored in lower 32 bits of a 64-bit destination register. This kind of pack operation is easily carried out according to the second embodiment.

(Third Embodiment)

Figure 7:
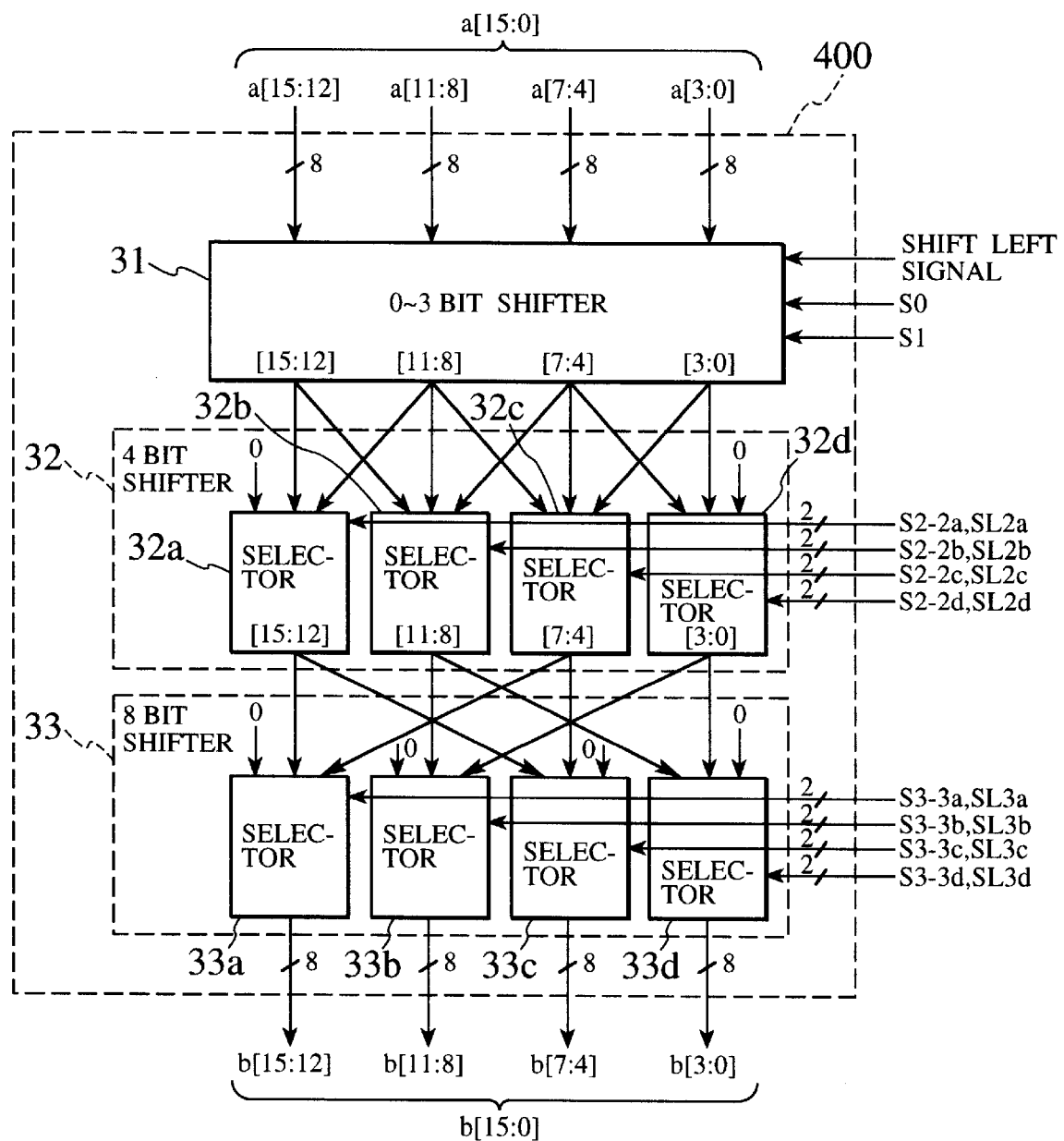
FIG. 7 shows the structure of a shift circuit according to a third embodiment of the present invention.

FIG. 7 shows the structure of a shift circuit according to the third embodiment of the present invention. This shift circuit 400 handles 16-bit input data. Namely, the shift circuit 400 receives 16-bit input data a[16:0], shifts the same in a higher (left in the figure) or lower (right in the figure) direction by a specified number of bits, and provides 16-bit output data b[16:0]. The shift circuit 400 consists of a first stage shifter 31 for receiving the input data and shifting the same by any one of 0 to 3 bits, a second stage shifter 32 for receiving the shifted 16-bit result from the first stage shifter 31 and shifting the same by 4 bits, and a third stage shifter 33 for receiving the shifted 16-bit result from the second stage shifter 32 and carrying out an 8-bit shift in 4-bit units. These shifters 31 to 33 are cascaded.

The first stage shifter 31 shifts the input data in the higher direction if a shift left signal SL1 indicating a shifting direction is active (for example, level "1") and in the lower direction if the signal SL1 is inactive (level "0"). The number of bits to shift is instructed with shift amount signals (S1, S0) of 2 bits encoded in binary numbers and is any one of 0 to 3. The second stage shifter 32 consists of four selectors 32a, 32b, 32c, and 32d each of which is a 3-input 1-output selector similar to the one shown in FIG. 2A. The selectors 32a to 32d of FIG. 7 receive shift left signals SL2a, SL2b, SL2c, and SL2d, respectively, each being one bit to indicate a shifting direction. More precisely, the selector 32a receives the signal SL2a, the selector 32b receives the signal SL2b, the selector 32c receives the signal SL2c, and the selector 32d receives the signal SL2d. The selectors 32a to 32d also receive shift amount signals S2-2a, S2-2b, S2-2c, and S2-2d, respectively, each indicating the number of bits (4 bits) to shift. More precisely, the selector 32a receives the signal S2-2a, the selector 32b receives the signal S2-2b, the selector 32c receives the signal S2-2c, and the selector 32d receives the signal S2-2d.

In this structure, the selector 32a selects the shifted output [11:8] of the first stage shifter 31 and shifts the same in the higher direction if the shift amount signal S2-2a is "1" to indicate a 4-bit shift and the shift left signal SL2a is active (for example, level "1"), selects 4 bits of "0" if the signal SL2a is inactive (level "0") with the signal S2-2a being "1," and selects the shifted output [15:12] of the first stage shifter 31 without regard to the signal SL2a if the signal S2-2a is "0." The selector 32b selects the shifted output [7:4] of the first stage shifter 31 and shifts the same in the higher direction if the shift amount signal S2-2b is "1" to indicate a 4-bit shift and the shift left signal SL2b is active (for example, level "1"), selects the shifted output [15:12] of the first stage shifter 31 and shifts the same in the lower direction if the signal SL2b is inactive (level "0") with the signal S2-2b being "1," and selects the shifted output [11:8] of the first stage shifter 31 without regard to the signal SL2b if the signal S2-2b is "0." The selector 32c selects the shifted output [3:0] of the first stage shifter 31 if the shift amount signal S2-2c is "1" to indicate a 4-bit shift and the shift left signal SL2c is active (for example, level "1"), selects the shifted output [11:8] of the first stage shifter 31 and shifts the same in the lower direction if the signal SL2c is inactive (level "0") with the signal S2-2c being "1," and selects the shifted output [7:4] of the first stage shifter 31 without regard to the signal SL2c if the signal S2-2c is "0." The selector 32d selects 4 bits of "0" if the shift amount signal S2-2d is "1" to indicate a 4-bit shift and the shift left signal SL2d is active (for example, level "1"), selects the shifted output [7:4] of the first stage shifter 31 and shifts the same in the lower direction if the signal SL2d is inactive (level "0") with the signal S2-2d being "1," and selects the shifted output [3:0] of the first stage shifter 31 without regard to the signal SL2d if the signal S2-2d is "0."

The third stage shifter 33 consists of four selectors 33a, 33b, 33c, and 33d each of which is the same 3-input 1-output selector as that of FIG. 2B. The selectors 33a to 33d of FIG. 7 receive shift left signals SL3a, SL3b, SL3c, and SL3d, respectively, each being a one-bit signal indicating a shifting direction. More precisely, the selector 33a receives the signal SL3a, the selector 33b receives the signal SL3b, the selector 33c receives the signal SL3c, and the selector 33d receives the signal SL3d. The selectors 33a to 33d also receive shift amount signals S3-3a, S3-3b, S3-3c, and S3-3d, respectively, each indicating the number of bits (8 bits) to shift. More precisely, the selector 33a receives the signal S3-3a, the selector 33b receives the signal S3-3b, the selector 33c receives the signal S3-3c, and the selector 33d receives the signal S3-3d.

In this structure, the selector 33a selects the shifted output [7:4] of the selector 32c of the second stage shifter 32 and shifts the same in the higher direction if the shift amount signal S3-3a is "1" to indicate an 8-bit shift and the shift left signal SL3a is active (for example, level "1"), selects 4 bits of "0" if the signal SL3a is inactive (level "0") with the signal S33a being "1," selects the shifted output [15:12] of the selector 32a of the second stage shifter 32 without regard to the signal SL3a if the signal S3-3a is "0," and provides the shifted output b[15:12] of the shift circuit 400. The selector 33b selects the shifted output [3:0] of the selector 32d of the second stage shifter 32 and shifts the same in the higher direction if the shift amount signal S33b is "1" to indicate an 8-bit shift and the shift left signal SL3b is active (for example, level "1"), selects 4 bits of "0" if the signal SL3b is inactive (level "0") with the signal S3-3b being "1," selects the shifted output [11:8] of the selector 32b of the second stage shifter 32 without regard to the signal SL3b if the signal S3-3b is "0," and provides the shifted output b[11:8] of the shift circuit 400. The selector 33c selects 4 bits of "0" if the shift amount signal S3-3c is level "1" to indicate an 8-bit shift and the shift left signal SL3c is active (for example, level "1"), selects the shifted output [15:12] of the selector 32a of the second stage shifter 32 and shifts the same in the lower direction if the signal SL3c is inactive (level "0") with the signal S3-3c being "1," selects the shifted output [7:4] of the selector 32c of the second stage shifter 32 without regard to the signal SL3c if the signal S3-3c is "0," and provides the output b[7:4] of the shift circuit 400. The selector 33d selects 4 bits of "0" if the shift amount signal S3-3d is "1" to indicate an 8-bit shift and the shift left signal SL3d is active (for example, level "1"), selects the shifted output [11:8] of the selector 32b of the second stage shifter 32 and shifts the same in the lower direction if the signal SL3d is inactive (level "0") with the signal S3-3d being "1," selects the shifted output [3:0] of the selector 32d of the second stage shifter 32 without regard to the signal SL3d if the signal S3-3d is "0," and provides the shifted output b[3:0] of the shift circuit 400.

In this way, the third embodiment variously changes the shift left and shift amount signals applied to the second and third stage shifters 32 and 33, to partly shift input data in 4-bit units or change the number of bits to shift and the shifting direction of each part of input data. Consequently, the third embodiment realizes a variety of shifting operations on input data without dedicated hardware.

(Fourth Embodiment)

Figure 8:
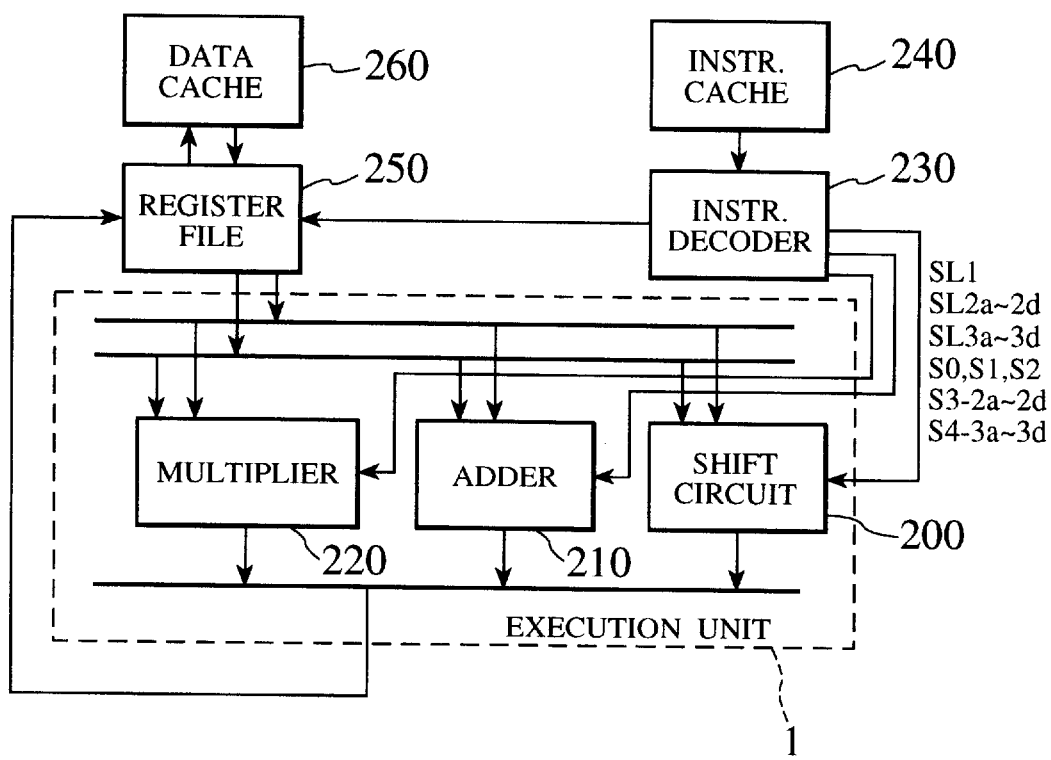
FIG. 8 shows an outline of a microprocessor according to a fourth embodiment of the present invention.

The present invention is not limited to the shift circuits but is also applicable to systems such as microprocessors and DSPs that employ the shift circuits. FIG. 8 schematically shows the structure of a microprocessor according to the fourth embodiment of the present invention. This microprocessor has at least an instruction cache (I cache) 240, a data cache (D cache) 260, an instruction decoder 230, a register file 250, and an execution unit 1. The execution unit 1 has at least a shift circuit 200, an adder 210, and a multiplier 220. The shift circuit 200 has, similar to the shift circuit of the first embodiment, a first stage shifter for receiving 32b it input data and shifting the same by any one of 0 to 7 bits, a second stage shifter for receiving the shifted 32b it result from the first stage shifter and shifting each byte thereof by 8 bits, and a third stage shifter for receiving the shifted 32-bit result from the second stage shifter and shifting each byte thereof by 16 bits. The first stage shifter receives the input data from the D cache 260 through the register file 250 and shifts the same by any one of 0 to 7 bits that is specified by a shift left signal SL1 and shift amount signals S0, S1, and S2 provided by the instruction decoder 230. The instruction decoder 230 generates, according to signals stored in the I cache 240, shift left signals SL1, SL2a to SL2d, and SL3a to SL3d, and shift amount signals S0 to S2, S3-2a to S3-2d, and S4-3a to S4-3d.

The second stage shifter consists of four 3-input 1-output selectors, which receive the shift left signals SL2a, SL2b, SL2c, and SL2d, respectively, each being a one-bit signal, from the instruction decoder 230. The instruction decoder 230 also provides the four selectors of the second stage shifter with the shift amount signals S32a, S3-2b, S3-2c and S3-2d, respectively, each indicating the number of bits (8 bits) to shift.

Similarly, the third stage shifter consists of four 3-input 1-output selectors that receive the shift left signals SL3a, SL3b, SL3c, and SL3d, respectively, each being a one-bit signal supplied by the instruction decoder 230 and indicating a shifting direction. In addition, the selectors receive the shift amount signals S4-3a, S4-3b, S4-3c, and S4-3d, respectively, each being supplied by the instruction decoder 230 and indicating the number of bits (16 bits) to shift.

Changing the shift left signals SL1, SL2a to SL2d, and SL3a to SL3d and shift amount signals S0 to S2, S3-2a to S3-2d, and S4-3a to S4-3d in various ways realizes many data operations such as a byte reverse operation, a half-word reverse operation, a byte shuffle operation, and pack/unpack operation. The output of the shift circuit 200 as well as the outputs of the adder 210 and multiplier 220 are supplied to the register file 250, and if required, are stored in the D cache 260.

The fourth embodiment of the present invention employs the simple structure of FIG. 8 to realize a variety of data operations without special dedicated hardware. Consequently, it realizes a highly versatile microprocessor having a simple structure.

Various modifications will become possible for those skilled in the art after receiving the teachings of the present disclosure without departing from the scope thereof. For example, although the first to fourth embodiments handle 32-bit, 64-bit, and 16-bit input data, the present invention is also applicable to a shift circuit that handles 128-bit input data, or more generally, $2^n$-bit input data. Although the first stage shifters 71 and 21 of the first and second embodiments that shift input data by any one of 0 to 7, or 0 to 3 bits have been explained each to be the same as that of the prior art, they may have selectors that receive, like those of the second and third stage shifters, independent control signals. The present invention is applicable not only to the microprocessor of the type disclosed in the fourth embodiment but also to other types of microprocessors and DSPs.

What is claimed is:

1. A shift circuit comprising a sequence of "n-2" shifters, wherein:
   a first stage shifter receives $2^n$-bit input data, shifts the input data in a higher or lower direction by any one of 0 to 7 bits, and provides a second stage shifter with a shifted result; and
   any one of the second to "m"th stage shifters receives a shifted $2^n$-bit result from preceding stage shifter and independently shifts each byte of the same in the higher or lower direction by $2^{(m+1)}$ bits, where $n \geq 5$ and $2 \leq m \leq n-2$.

2. The shift circuit of claim 1, wherein the second stage shifter consists of selectors each of which is to select a byte and receives its own shift left and shift amount signals, independently.

3. The shift circuit of claim 2, wherein each of the selectors is a 3-input 1-output selector that selects a specific one of first, second, and third inputs.

4. The shift circuit of claim 3, wherein the selector selects the first input if the shift amount signal is "1" and the shift left signal is "1," the third input if the shift amount signal is "1" and the shift left signal is "0," and the second input without regard to the shift left signal if the shift amount signal is "0."

5. The shift circuit of claim 3, wherein the first input of the lowest one of the selectors and the third input of the highest one of the selectors are each "0."

6. The shift circuit of claim 1, wherein the "m"th stage shifter consists of selectors each of which is to select a byte and receives its own shift left and shift amount signals, independently, where $m \geq 3$.

7. The shift circuit of claim 6, wherein each of the selectors is a 3-input 1-output selector that selects a specific one of first, second, and third inputs.

8. The shift circuit of claim 7, wherein the selector selects the first input if the shift amount signal is "1" and the shift left signal is "1," the third input if the shift amount signal is "1" and the shift left signal is "0," and the second input without regard to the shift left signal if the shift amount signal is "0."

9. The shift circuit of claim 7, wherein the first or third input of the selector is "0."

10. The shift circuit of claim 1, wherein the second to "m"th stage shifters selectively provide "0"s in bytes.

11. A shift circuit comprising a sequence of first, second, and third stage shifters, wherein:
    the first stage shifter receives 16-bit input data, shifts the input data in a higher or lower direction by any one of 0 to 3 bits, and provides the second stage shifter with a shifted result;
    the second stage shifter receives the shifted result from the first stage shifter and independently shifts each 4 bits of the shifted result in the higher or lower direction by 4 bits; and
    the third stage shifter receives the shifted result from the second stage shifter and independently shifts each 4 bits of the shifted result in the higher or lower direction by 8 bits.

12. The shift circuit of claim 11, wherein:
    each of the second and third stage shifters consists of selectors each to select 4 bits; and
    each of the selectors receives its own shift left and shift amount signals, independently.

13. The shift circuit of claim 12, wherein the selector is a 3-input 1-output selector that selects a specific one of first, second, and third inputs.

14. The shift circuit of claim 13, wherein the selector selects the first input if the shift amount signal is "1" and the shift left signal is "1," the third input if the shift amount signal is "1" and the shift left signal is "0," and the second input without regard to the shift left signal if the shift amount signal is "0."

15. The shift circuit of claim 13, wherein the first input of the lowest one among the selectors of the second stage shifter and the third input of the highest one among the same are each "0."

16. The shift circuit of claim 13, wherein the first or third input of each of the selectors of the third stage shifter is "0."

17. The shift circuit of claim 12, wherein the second and third stage shifters selectively provide "0"s in 4-bit units.

18. A system having a shift circuit comprising a sequence of "n-2" shifters, wherein:

a first stage shifter receives $2^n$-bit input data, shifts the input data in a higher or lower direction by any one of 0 to 7 bits, and provides a second stage shifter with a shifted result; and each of the second to "m"th stage shifters consists of selectors each of which is to select a byte and receives its own shift left and shift amount signals, and each of the second to "m"th stage shifters receives a shifted $2^n$-bit result from the preceding stage shifter and shifts each byte thereof independently in the higher or lower direction by $2^{(m+1)}$ bits, where $n \geq 5$ and $2 \leq m \leq n-2$.

19. A system comprising:

(a) an execution unit including a shift circuit comprising a sequence of "n-2" shifters, wherein:

a first stage shifter shifts input data in a higher or lower direction by any one of 0 to 7 bits and provides a second stage shifter with a shifted result; and each of the second to "m"th stage shifters consists of selectors each for selecting a byte, receives a shifted $2^n$-bit result from preceding stage shifter, and shifts each byte thereof independently in the higher or lower direction by $2^{(m+1)}$ bits;

(b) an instruction decoder for providing the selectors and the first stage shifter with independent shift left and shift amount signals; and (c) a register for supplying $2^n$-bit input data to the first stage shifter and receiving the output of the "n-2"th stage shifter, where $n \geq 5$ and $2 \leq m \leq n-2$.

20. A system comprising:

(a) an execution unit including a shift circuit comprising a sequence of first, second, and third stage shifters, wherein:

the first stage shifter shifts input data in a higher or lower direction by any one of 0 to 3 bits and provides the second stage shifter with a shifted result;

the second stage shifter consists of selectors each for selecting 4 bits, receives the shifted result from the first stage shifter, and shifts each 4 bits thereof independently in the higher or lower direction by 4 bits; and the third stage shifter consists of selectors each for selecting 4 bits, receives the shifted result from the second stage shifter, and shifts each 4 bits thereof independently in the higher or lower direction by 8 bits;

(b) an instruction decoder for providing the selectors and first stage shifter with independent shift left and shift amount signals; and (c) a register for providing the first stage shifter with 16-bit input data and receiving the output of the third stage shifter.

* * * * *